United States Patent
Von Andrian-Werburg

(10) Patent No.: US 6,615,776 B1
(45) Date of Patent: Sep. 9, 2003

(54) METHOD OF OPERATING A MULTI-CYLINDER INTERNAL COMBUSTION ENGINE

(75) Inventor: Stephen Von Andrian-Werburg, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/308,871

(22) Filed: Dec. 3, 2002

(30) Foreign Application Priority Data

Dec. 5, 2001 (DE) .......................... 101 59 758

(51) Int. Cl.⁷ ................................. F01L 1/34
(52) U.S. Cl. .................. 123/90.15; 123/90.16; 123/198 F; 123/198 DB
(58) Field of Search .............. 123/90.15, 90.16, 123/198 DB, 198 F

(56) References Cited

U.S. PATENT DOCUMENTS 5,642,703 A 7/1997 Stockhausen et al.

FOREIGN PATENT DOCUMENTS

| DE | 33 15 396 | 10/1994 |
|---|---|---|
| DE | 195 46 549 | 3/1997 |
| DE | 196 06 402 | 8/1998 |
| DE | 199 07 851 | 8/2000 |
| EP | 0 732 489 | 11/1998 |
| EP | 1 054 148 | 11/2000 |
| WO | WO 00/40847 | 7/2000 |

*Primary Examiner*—Thomas Denion
*Assistant Examiner*—Kyle Riddle
(74) *Attorney, Agent, or Firm*—Klaus J. Bach

(57) ABSTRACT

In a multi-cylinder internal combustion engine in which, for fuel saving purposes during part-load operation, some of the cylinders (2) can be cut off by an interruption of the fuel supply to the respective cylinders and by the shutdown and closing of their inlet valves (6) and outlet valves (7) until the refiring of the cylinders (2) when higher operating loads of the internal combustion engine (1) are required, a smooth operating behavior of the internal combustion engine (1) during the changeover between the fired and the cut-off operation of the cylinders (2) is achieved by an additional compensating opening of the outlet valves (7) irrespective of the gas-exchange control times of the valves for fired cylinder operation.

9 Claims, 2 Drawing Sheets

METHOD OF OPERATING A MULTI-CYLINDER INTERNAL COMBUSTION ENGINE

BACKGROUND OF THE INVENTION

The invention relates to a method of operating a multi-cylinder internal combustion engine, wherein some of the cylinders are cut off in part-load operation by an interruption of the fuel supply and by keeping selected valves closed.

By a cylinder or some of the cylinders of an engine being shut down, the fuel consumption can be markedly reduced in part-load operation, especially where large-volume engines are concerned. In this case, the fuel supply to the cylinders to be cut off is interrupted, and the inlet valves and outlet valves of the cylinders are shut down and closed until the refiring of the cylinders. DE 33 15 396 A1 discloses a multi-cylinder internal combustion engine, in which a control device closes only the inlet valve of the cut-off cylinder and the outlet valve of this cylinder continues to be open. It is said that, as a result, the internal combustion engine is operated quietly and smoothly under part-load conditions, since no compression takes place of air which has remained in the cut-off cylinder, such compression being considered harmful. It has been shown, however, that the closing of the gas-exchange valves is advantageous during the cylinder cut-off for achieving as high a fuel saving as possible. The cylinders which continue to provide combustion operate with high compression, while the cut-off cylinders are operated with the valves closed.

During the changeover from the fired operating mode of the cylinders to the cut-off operating mode and back again, jerking may occur, which the driver of a motor vehicle driven by the internal combustion engine feels to be disturbing. The fuel-saving potential depends essentially on how frequently the internal combustion engine can be operated in the operating mode with cut-off cylinders. A high changeover frequency requires a very good changeover quality between operating with all the cylinders and the cut-off mode to provide the highest possible driving comfort.

For a cylinder cut-off for the purposes of fuel saving, in order to achieve smoother running of the internal combustion engine, DE 196 06 402 C2 provides a cut-off pattern in which each fired work cycle is followed by two non-firings which are the result of the cut-off of the fuel supply.

DE 199 07 851 A1 provides a braking engagement of power-operated brakes for the purpose of avoiding a changeover pressure. As an additional measure for avoiding the changeover pressure, an adjustment of the ignition angle and a throttle-valve adjustment, which are to be brought about by the engine control, are proposed.

It is the object of the present invention to provide a method for operating a multi-cylinder internal combustion engine, by which, in addition to achieving as high a fuel saving as possible during the cylinder cut-off operation of the engine, a smooth operating behavior of the internal combustion engine during the changeover between a fired and a cut-off cylinder operation is achieved.

SUMMARY OF THE INVENTION

In a multi-cylinder internal combustion engine in which, for fuel saving purposes during part-load operation, some of the cylinders (2) can be cut off by an interruption of the fuel supply to the respective cylinders and by the shutdown and closing of their inlet valves (6) and outlet valves (7) until the re-firing of the cylinders (2) when higher operating loads of the internal combustion engine (1) are required, a smooth operating behavior of the internal combustion engine (1) during the changeover between the fired and the cut-off operation of the cylinders (2) is achieved by an additional compensating opening of the outlet valves (7) irrespective of the gas-exchange control times of the valves for fired cylinder operation.

The invention is based, in this context, on the knowledge that, during a cut-off action immediately after the last fired work cycle, increased power losses occur due to compression work. By virtue of a brief opening of the outlet valve of the cut-off cylinder after the last combustion cycle, the compression work of the piston is reduced and the changeover quality during the cut-off of the cylinder is thereby improved. Additional compensating openings of the outlet valve may take place at least during the first non-fired work cycle. Advantageously the duration of the compensating opening is predetermined by a control unit as a function of the operating state of the internal combustion engine and is increasingly shortened in the following work cycles. As a result, on the one hand, the loss fraction due to compression work is rapidly reduced, whilst at the same time the gas-exchange valves can be transferred into the desired closed position for the purpose of fuel saving without any jerk phenomena. The compensating opening of the outlet valve expediently takes place in a time interval which lies within the crank-angle range of the opening control time of the outlet valve during gas exchange in fired operation. The activation of the outlet valve is simplified when the opening time point of the outlet valve during compensating opening of the valve corresponds to the opening time point in fired operation. The duration of the compensating opening is advantageously defined by a predetermination of the closing time point of the outlet valve as a function of the operating state of the internal combustion engine.

During the changeover from cut-off operation into fired operation, the compensating opening according to the invention results in a quiet operating behavior, in that an over-expansion of the gas enclosed in the combustion chamber is avoided before the first fired work cycle. The compensating opening is advantageously provided instead of the gas-exchange timing of the outlet valve during the normal operation of the internal combustion engine, with the result that the outlet interval is briefly displaced. This considerably reduces the pumping loss which arises during the first opening of the outlet valve within the framework of the gas exchange, when the outlet valve opens near the bottom dead center of the piston movement and under-pressure prevails in the combustion chamber of the previously cut-off cylinder. The compensating opening, which represents the first opening of the outlet valve after the cut-off phase of the cylinder, expediently takes place in a the work cycle crank-angle range which is at about midway in the piston stroke. The opening time point of the outlet valve, which lies in the region of bottom dead center during combustion operation, is displaced by virtue of the location of the compensating opening, so that a lower pressure difference between combustion chamber and exhaust passage is obtained during the opening following activation of the cylinder than during the opening of the outlet valve in normal operation. Particularly advantageously, the compensating opening takes place during the expulsion stroke of the piston, as a result of which, in the event of the late opening of the outlet valve at midway of the piston stroke after the bottom phase, the exhaust gas enclosed in the combustion chamber can be expelled immediately.

By the omission of the transitional phases between the fired operating mode and the cut-off operating mode, the method according to the invention makes it possible in advance to have an accurate knowledge of the power loss of the internal combustion engine after the changeover action. The torques to be delivered by the individual cylinders can thereby accurately be controlled in advance. It is therefore unnecessary to apply transfer functions in the control unit, for example an adjustment of the ignition point during the changeover phase or provide for similar measures. This allows a substantially more frequent utilization of the operation of the internal combustion engine with cut-off cylinders which is beneficial for low consumption.

An exemplary embodiment of the invention will be explained below in greater detail with reference to the accompanying drawings:

DESCRIPTION OF A PREFERRED EMBODIMENT

Figure 1:
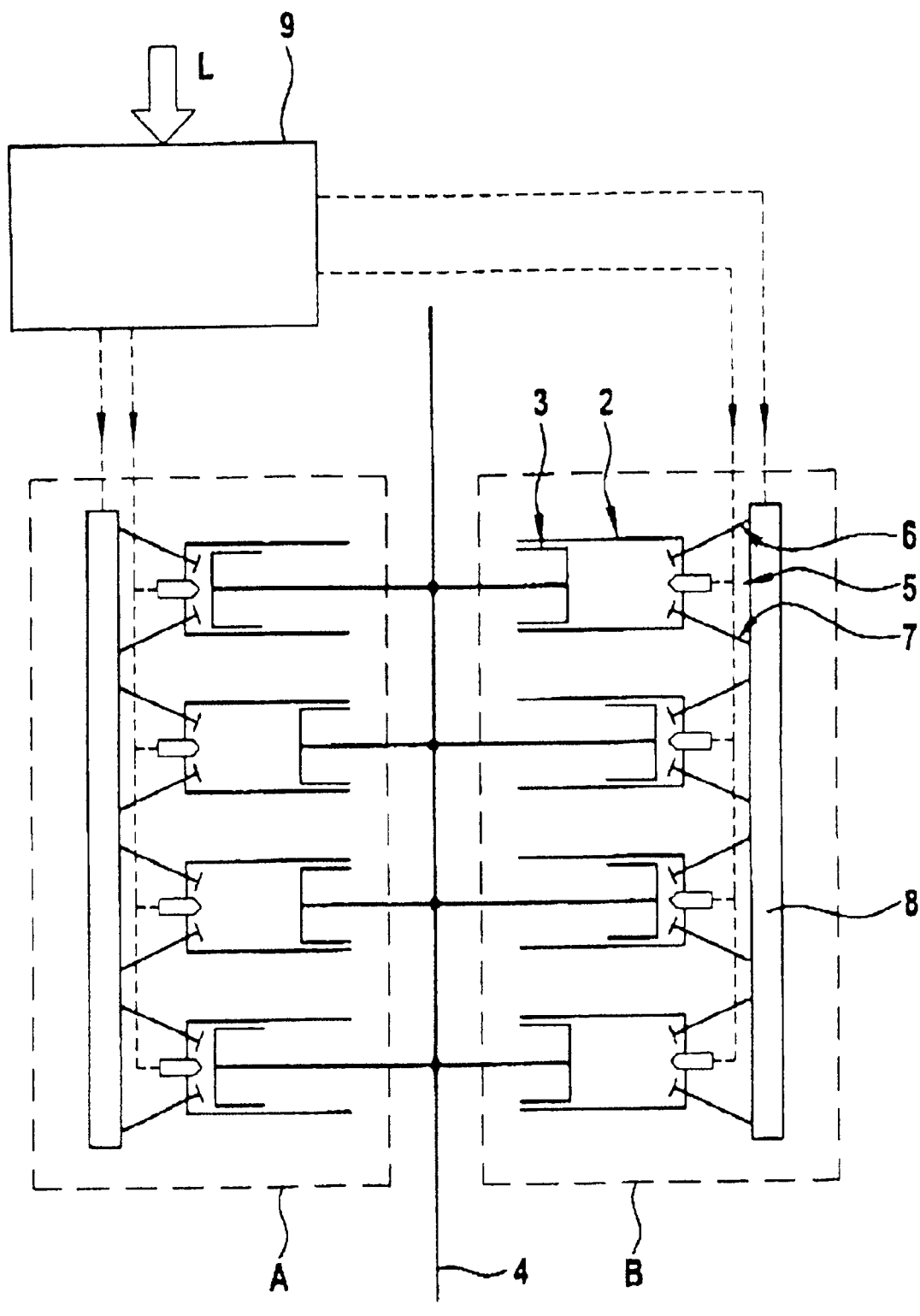
FIG. 1 is a diagrammatic view of a multi-cylinder internal combustion engine.

FIG. 1 shows a spark-ignition internal combustion engine with a plurality of cylinders 2, in each of which a piston 3 is arranged longitudinally moveably and connected to a crankshaft 4. Each cylinder 2 includes an injector 5 for direct fuel injection into the cylinder. In each work cycle of the cylinders 2, a gas exchange is carried out in a well-known manner for providing fresh gas for fuel combustion by the opening of an inlet valve 6. The burnt exhaust gases are expelled by the piston 3 upon the opening of the outlet valve 7. The gas-exchange valves 6, 7 are actuated by a valve drive 8. In this case, a variably adjustable valve gear operating mechanism is used, by means of which individual valve control times of the inlet valve and of the outlet valve can be obtained in each work cycle, for example electromagnetic valve controls (EMVC) or electrohydraulic valve controls (EHVC). The valve drive 8 is controlled by a control unit 9 which thus determines the valve opening times.

Some of the cylinders 2 can be cut off during low load engine operation. The cylinders which continue to be fired continue to operate with increased compression which results in a fuel saving. In this case, one or more cylinders 2 can be cut off, for example, one of each of the two cylinder blocks A, B comprising a plurality of cylinders 2. To cut off a cylinder, the fuel supply to the respective cylinder is interrupted, and the inlet valves 6 and outlet valves 7 are shut down and kept closed up to the refiring of the cylinder 2 in the event of higher operating loads of the internal combustion engine. The control unit 9 in this case causes further fuel injection to be discontinued by suppressing corresponding control signals for the injector 5 of the cylinder 2 and shuts down the individually operable gas-exchange valves of this cylinder 2.

When a higher operating load L is indicated to the control unit, some or all of the cut-off cylinders 2 are reactivated depending on an increase in the load requirement L. In order to avoid jerking of the internal combustion engine 1 during the cut-off of one or more cylinders 2 or during reactivation, according to the invention an additional compensating opening of the outlet valve independently of the gas-exchange control times of the latter for fired operation is provided. During the cut-off of a cylinder 2, therefore, the outlet valve 7 is opened once again after the shutdown of the respective inlet valve.

Figure 2:
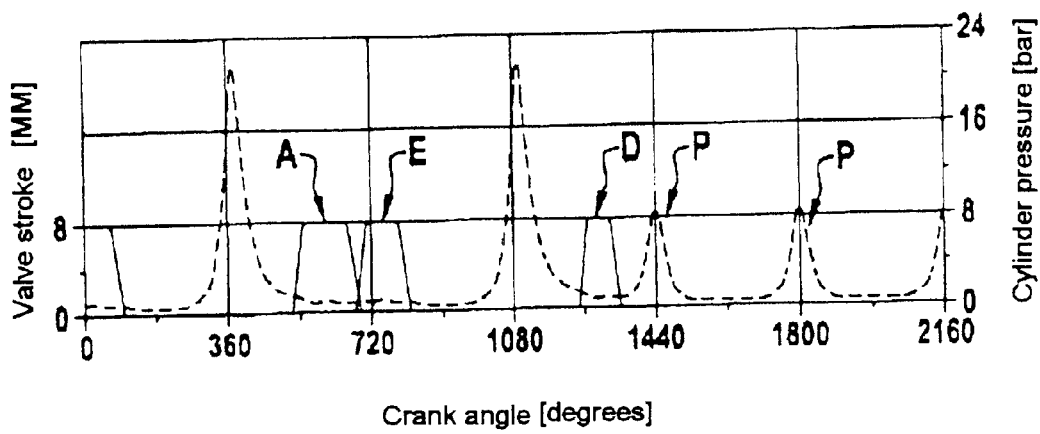
FIG. 2 is a graphical illustration of the pressure profile in the combustion chamber during a cylinder cut-off operation.

The effects of the compensating opening according to the invention are explained below by means of the graphic illustration of the pressure profile in the combustion chamber in FIG. 2. In this case, a pressure peak caused by the compression movement of the piston and the gas expansion due to combustion can be seen in the crank-angle range of 360° in the front part of the pressure profile. In the subsequent work cycle, the outlet valve is opened in the region of bottom dead center and the burnt exhaust gas is expelled during the opening interval A. Thereafter, by the inlet valve being opened, fresh gas enters the combustion chamber for the next work cycle during the opening interval E.

After the last fired work cycle and the corresponding pressure peak, which lies approximately at a crank angle of 1080°, the fuel supply is interrupted for the cut-off of the cylinder and the gas-exchange valves are shut down. During the first non-fired work cycle, a compensating opening D of the outlet valve takes place according to the invention, whereby exhaust gases can be expelled from the cylinder. A certain state of pressure peaks P of the following work cycles is thereby established immediately, with the result that the power loss due to compression work of the piston is reduced considerably and the operating smoothness of the internal combustion engine during the cut-off of the cylinder is improved. The compensating opening D takes place during the first non-fired work cycle, but it may also be expedient to provide brief opening intervals for the compensating opening D over a plurality of work cycles.

The duration of the compensating opening is predetermined by the control unit as a function of the operating state of the internal combustion engine. The duration of the compensating opening D is shortened in the following work cycles if there is a plurality of pressure-compensating actions. The compensating opening D takes place in a time interval which lies within the crank-angle range of the opening control time of the outlet valve during fired operation. In the present exemplary embodiment, the compensating opening commences at a time point which corresponds to the opening time point of the outlet valve during outlet opening A in fired operation, with as low a deviation as possible from the opening cycles of the outlet valve. The closing time point of the outlet valve during compensating opening D is predetermined as a function of the operating load of the internal combustion engine and is set in such a way that an exhaust-gas quantity is expelled which is exactly such that, during the following piston stroke, an equilibrium is established between over-pressure at the top dead center of the piston movement and the under-pressure at the bottom dead center. In this case, a stationary state of the maximum combustion chamber pressure is instantaneously achieved, and, in the following work cycles, it is necessary merely to compensate for a change in density of the enclosed exhaust gas which is caused by a decrease in temperature. This compensation can take place automatically by leakage, in which case, as already mentioned, an additional compensating opening may be expedient.

Figure 3:
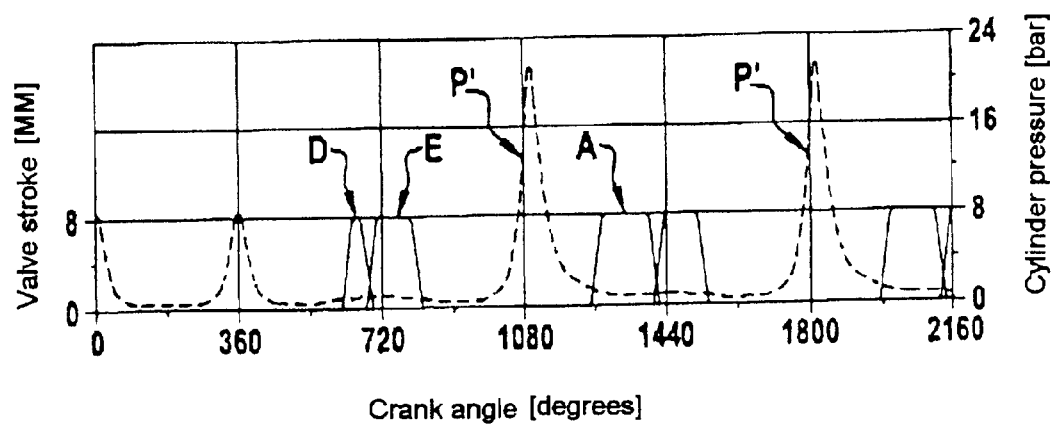
FIG. 3 is a graphical illustration of the pressure profile during the changeover to fired operation with late compensating valve opening.

FIG. 3 shows the profile of the combustion-chamber pressure during a changeover action from shut-down operation to fired operation. During the fired work cycles, higher pressure peaks P' are obtained in the end part of the graphic profile. They occur in the first fired work cycle between a 720° crank angle and a 1440° crank angle on account of the expansion of the combustion gas. The fired work cycle commences with the opening E of the inlet valve and is terminated with the closing of the outlet valve A. According to the invention, in the last non-fired work cycle, along with the low pressure difference between combustion chamber and exhaust passage, a compensating opening D of the outlet valve occurs independently of the gas-exchange control times of the latter. The pumping loss due to over-expansion of the gas enclosed in the combustion chamber immediately before activation of the cylinder is thereby avoided.

The compensating opening D commences in the last non-fired work cycle of the cylinder in a crank-angle range which corresponds approximately to a location midway of the piston stroke, with the result that the pressure difference between combustion chamber and exhaust passage to be overcome by the piston is minimized. The commencement of the opening interval A of the outlet valve during gas exchange is normally in the region of the bottom dead center and, within the framework of the preceding compensating opening, is displaced into the region of the half the piston stroke. In the exemplary embodiment of the method according to the invention, as shown in FIG. 3, the start of the compensating opening D is displaced in the direction of "late opening" and thus takes place during the upward movement of the piston. The exhaust gases located in the cylinder can thereby be expelled directly from the cylinder.

Figure 4:
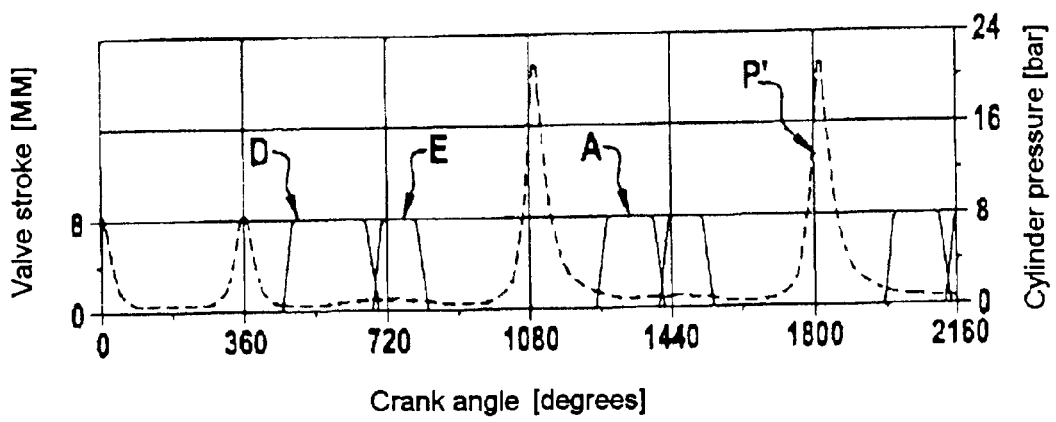
FIG. 4 is a graphical illustration of the pressure profile during the changeover to fired operation with early compensating valve opening.

FIG. 4 shows an alternative method to FIG. 3, wherein the compensating opening D likewise commences at a time point where the piston is midway in its stroke travel. In this case, the commencement of opening during the compensating opening D is displaced in the "early" direction, as compared with the opening time point during the gas-exchange opening A of the compensation valve, and takes place during the downward movement of the piston. With the outlet valve open during the compensating opening D, first exhaust gas is sucked out of the exhaust tract into the cylinder and is then expelled again during the upward movement. By virtue of the reduced pressure differences, this gas exchange which takes place without combustion occurs at low flow velocities, whereby the pumping-loss fraction of the piston work is reduced.

What is claimed is:

1. A method of operating a multi-cylinder internal combustion engine, wherein some of the cylinders (2) are cutoff during part-load operation of the engine by an interruption of the fuel supply to the respective cylinders (2) and the shutdown and closing of the inlet valves (6) and outlet valves (7) of the respective cylinders up to the re-firing of the cylinders (2) in the event of higher operating loads (L) of the internal combustion engine (1), said method comprising the steps of opening during changeover between the fired operation and the cut-off operation of the cylinder (2) in a compensating opening procedure, the respective outlet valves (7) irrespective of the gas-exchange control times of the engine for fired operation.

2. A method according to claim 1, wherein, during cut-off of the respective cylinder (2), the outlet valve (7) is opened at least during the first non-fired work cycle, the duration of such compensating opening being predetermined by a control unit (9) as a function of the operating state (L) of the internal combustion engine (1).

3. A method according to claim 2, wherein the duration of the compensating opening (D) is shortened increasingly in the following work cycles.

4. A method according to claim 2, wherein the compensating opening (D) of the outlet valve (7) takes place in a time interval which lies within the crank-angle range of the opening control time of the outlet valve (7) during fired operation.

5. A method according to claim 4, wherein the opening time point of the outlet valve (7) during compensating opening (D) corresponds to the opening time point in fired operation.

6. A method according to claim 2, wherein the closing time point of the outlet valve (7) during compensating opening (D) is predetermined as a function of the operating load (L) of the internal combustion engine (1).

7. A method according to claim 1, wherein during the changeover from cut-off operation to fired operation, the outlet valve is opened in a crank-angle range which lies approximately at midway of the stroke travel of a piston (3) in the cylinder (2).

8. A method according to claim 7, wherein the outlet valve compensation opening occurs during the expulsion stroke.

9. A method according to claim 7, wherein the outlet valve is opened for pressure compensation during the period in which the outlet valve (7) would be opened during normal engine operation.

* * * * *